(12) United States Patent
Zhu et al.

(10) Patent No.: US 9,939,687 B2
(45) Date of Patent: Apr. 10, 2018

(54) LIQUID CRYSTAL CELL AND METHOD FOR FABRICATING THE SAME, LIQUID CRYSTAL DISPLAY PANEL, AND DISPLAY DEVICE

(71) Applicant: Boe Technology Group Co., Ltd., Beijing (CN)

(72) Inventors: Ming Zhu, Beijing (CN); Yafeng Yang, Beijing (CN); Teruaki Suzuki, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 513 days.

(21) Appl. No.: 14/555,933

(22) Filed: Nov. 28, 2014

(65) Prior Publication Data

US 2016/0139445 A1 May 19, 2016

(30) Foreign Application Priority Data

Nov. 14, 2014 (CN) .......................... 2014 1 0644400

(51) Int. Cl.
G02F 1/1339 (2006.01)

(52) U.S. Cl.
CPC ............. *G02F 1/13394* (2013.01); *G02F 2001/13396* (2013.01); *G02F 2001/13398* (2013.01);
(Continued)

(58) Field of Classification Search
None
See application file for complete search history.

(56) References Cited

U.S. PATENT DOCUMENTS 5,417,883 A * 5/1995 Epstein ................. C09K 19/02
252/299.01
6,157,480 A * 12/2000 Anderson ............... G02F 1/161
359/265
(Continued)

FOREIGN PATENT DOCUMENTS

CN 101900911 A 12/2010
CN 102636899 A 8/2012
(Continued)

OTHER PUBLICATIONS

Office Action from CN Application No. 201410644400.6 dated Aug. 30, 2016.
(Continued)

*Primary Examiner* — Jessica M Merlin
*Assistant Examiner* — Mark Teets
(74) *Attorney, Agent, or Firm* — Calfee, Halter & Griswold LLP

(57) ABSTRACT

A liquid crystal cell and method for fabricating the same, a liquid crystal display panel, and a display device are disclosed. The liquid crystal cell comprises an active area and a dummy area, and comprises a first and second substrate which are arranged oppositely and separated by spacers, and liquid crystal arranged between the first and second substrate. The liquid crystal cell further comprises a volume variation compensating component which is arranged in the active area, and the volume variation compensating component comprises a material with a thermal expansion coefficient opposite to that of the liquid crystal, so as to compensate variation in the volume of liquid crystal when temperature varies. Not only defects of gravity mura at high temperature and bubbles at low temperature are eliminated to spread LC Margin, but also the scope of application environment for the liquid crystal display panel is expanded.

14 Claims, 5 Drawing Sheets

(52) U.S. Cl.
CPC ...... *G02F 2201/54* (2013.01); *G02F 2202/36* (2013.01); *G02F 2203/60* (2013.01)

(56) References Cited

U.S. PATENT DOCUMENTS

| | | | | |
|---|---|---|---|---|
| 2003/0174994 | A1* | 9/2003 | Garito | B82Y 20/00 385/129 |
| 2005/0126700 | A1* | 6/2005 | Makimoto | B32B 37/24 156/285 |
| 2006/0125976 | A1* | 6/2006 | Kim | G02F 1/13394 349/88 |
| 2010/0302496 | A1* | 12/2010 | Zhao | G02F 1/13394 349/155 |
| 2015/0270508 | A1* | 9/2015 | Naito | C03C 8/24 257/40 |

FOREIGN PATENT DOCUMENTS

| | | |
|---|---|---|
| CN | 102749760 A | 10/2012 |
| CN | 204331233 U | 5/2015 |
| WO | 2006097993 A1 | 9/2006 |

OTHER PUBLICATIONS

Office Action from China Application No. 201410644400.6 dated Feb. 4, 2017.

\* cited by examiner

LIQUID CRYSTAL CELL AND METHOD FOR FABRICATING THE SAME, LIQUID CRYSTAL DISPLAY PANEL, AND DISPLAY DEVICE

RELATED APPLICATIONS

The present application claims the benefit of Chinese Patent Application No. 201410644400.6, filed Nov. 14, 2014, the entire disclosure of which is incorporated herein by reference.

FIELD OF THE INVENTION

The present disclosure relates to the field of liquid crystal display technology, and particularly to a liquid crystal cell and a method for fabricating the same, a liquid crystal display panel, and a display device.

BACKGROUND ART

In the existing liquid crystal display technology, liquid crystal is generally injected between glass substrates to form a liquid crystal display panel. With the increase or decrease of environment temperature, the glass substrates and the liquid crystal may expand or shrink. The liquid crystal has a thermal expansion coefficient which is much larger than other components in a liquid crystal cell like glass substrates, and this will introduce problems. In one aspect, at high temperature, the liquid crystal in the liquid crystal display panel thermally expands to an extent significantly larger than other components, a thickness of the liquid crystal cell is increased, and the spacers cannot thermally expand to the same extent. In this case, liquid crystal in the liquid crystal display panel which is oriented vertically tends to move downward due to gravity. This is so-called gravity mura at high temperature. In another aspect, when the liquid crystal display panel is at low temperature, the liquid crystal thermally shrinks to an extent greater than other components. Namely, in case the thickness of the liquid crystal cell is kept constant, the liquid crystal will not fully fill the liquid crystal cell and thus vacuum bubbles will appear. This is so-called bubbles at low temperature. These defects restrict the application conditions of the liquid crystal display device, affect the display effect of the liquid crystal display device, and thus impair user experience. During the fabricating process, the allowable controlling range for amount of liquid crystal in case of defects of gravity mura at high temperature and bubbles at low temperature is referred to as LC Margin.

There is a need in the art for improving the liquid crystal display panel in terms of defects of gravity mura at high temperature and bubbles at low temperature.

SUMMARY

The present disclosure aims to alleviate or solve the problems as mentioned above.

According to the present disclosure, by means of providing a volume variation compensating component in an active area of a liquid crystal cell, wherein the volume variation compensating component comprises a material with a thermal expansion coefficient opposite to that of the liquid crystal, so as to compensate variation in the volume of liquid crystal when temperature varies, the defects of gravity mura at high temperature and bubbles at low temperature are eliminated.

According to a first aspect of the present disclosure, there is provided a liquid crystal cell, comprising an active area and a dummy area, and comprising a first and second substrate which are arranged oppositely and separated by spacers, and liquid crystal arranged between the first and second substrate, wherein the liquid crystal cell further comprises a volume variation compensating component which is arranged in the active area, and the volume variation compensating component comprises a material with a thermal expansion coefficient opposite to that of the liquid crystal, so as to compensate variation in the volume of liquid crystal when temperature varies.

According to the present disclosure, the liquid crystal cell comprises a volume variation compensating component which is arranged in the active area, and the volume variation compensating component comprises a material with a thermal expansion coefficient opposite to that of the liquid crystal, so as to compensate variation in the volume of liquid crystal when temperature varies. In this way, not only defects of gravity mura at high temperature and bubbles at low temperature are eliminated to spread LC Margin, but also the scope of application environment (e.g. the range of operational temperature) for the liquid crystal display panel is expanded.

It is understood that, the expression of "one material has a thermal expansion coefficient opposite to that of another material" only refers to that the thermal expansion coefficients of these materials are opposite in sign, i.e., one of them has a positive thermal expansion coefficient while the other has a negative thermal expansion coefficient. It is further understood that a material with a positive thermal expansion coefficient refers to a material which expands with an increase in temperature and shrinks with a decrease in temperature, while a material with a negative thermal expansion coefficient refers to a material which expands with a decrease in temperature and shrinks with an increase in temperature. It is further understood that the expression "to compensate variation in the volume of liquid crystal when temperature varies" means to cancel out partially, and optionally cancel out completely variation in the volume of liquid crystal when temperature varies.

According to the present disclosure, the volume variation compensating component can be fillers which are uniformly dispersed within the liquid crystal.

According to the present disclosure, the fillers can be nanospheres, nanowires, or nanotubes.

According to the present disclosure, the spacers can be ball spacers.

According to the present disclosure, the spacers can be post spacers.

According to the present disclosure, the spacers can comprise main spacers and sub-spacers with a height smaller than that of the main spacers, and the volume variation compensating component can form the sub-spacers.

According to the present disclosure, the volume variation compensating component can be further arranged in the dummy area to form a buffer belt.

According to the present disclosure, the buffer belt can be arranged on the first substrate and/or the second substrate.

According to the present disclosure, the volume variation compensating component can comprise a material with a negative thermal expansion coefficient.

It is understood that the wording "comprise" is open-ended. For example, a volume variation compensating component comprising a material with a negative thermal expansion coefficient can not only relate to a volume variation compensating component which is completely made from a material with a negative thermal expansion coefficient, but also to a volume variation compensating component which includes a material apart from the material with a negative thermal expansion coefficient.

According to the present disclosure, the material with a negative thermal expansion coefficient can have an isotropic thermal expansion coefficient.

According to the present disclosure, the material with a negative thermal expansion coefficient can be selected from the group consisting of $ZrW_2O_8$, $HfW_2O_8$, $ZrV_2O_7$, and $ThP_2O_7$.

According to the present disclosure, the first substrate can be a color filter substrate, and the second substrate can be an array substrate.

According to a second aspect of the present disclosure, there is provided a liquid crystal display panel which can comprise the above-mentioned liquid crystal cell.

According to a third aspect of the present disclosure, there is provided a display device which can comprise the above-mentioned liquid crystal display panel.

The present liquid crystal display panel and display device share the same or similar beneficial effects as those of the above-mentioned liquid crystal cell, which are not repeated herein for simplicity.

According to a fourth aspect of the present disclosure, there is provided a method for fabricating a liquid crystal cell, comprising steps of: providing a color filter substrate and an array substrate; forming a volume variation compensating component in an active area, which comprises a material with a thermal expansion coefficient opposite to that of the liquid crystal, so as to compensate variation in the volume of liquid crystal when temperature varies; and assembling the color filter substrate and the array substrate, and curing a frame sealant to form a liquid crystal cell.

According to the present disclosure, the method can comprise: prior to dropping liquid crystal onto the array substrate, uniformly dispersing fillers in the liquid crystal.

According to the present disclosure, the method can comprise: forming main spacers and sub-spacers with a height smaller than that of the main spacers on the color filter substrate, wherein the volume variation compensating component forms the sub-spacers.

According to the present disclosure, the method can further comprise: in a dummy area, forming the volume variation compensating component as a buffer belt on the color filter substrate and/or the array substrate.

The present method for fabricating a liquid crystal cell shares the same or similar beneficial effects as those of the above-mentioned liquid crystal cell, which are not repeated herein for simplicity.

BRIEF DESCRIPTION OF DRAWINGS

These and other aspects of the present disclosure are apparent from and will be further elucidated, by way of example, with reference to the drawings, in which.

The drawings are not necessarily drawn to scale. The same reference numerals or the reference numerals which differs by a multiple of 100 are used to denote the same or similar components throughout the drawings.

DETAILED DESCRIPTION OF EMBODIMENTS

Figure 1A:
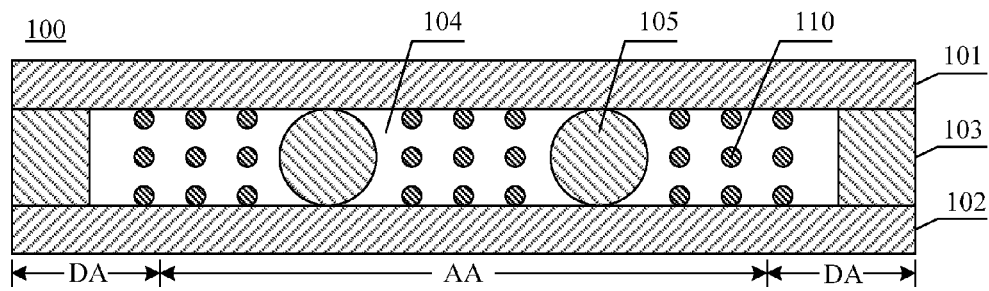
FIGS. 1A-1B are cross-sectional views illustrating a liquid crystal cell of the present disclosure in a first scenario, respectively.

The present disclosure will be elucidated hereinafter in detail with reference to the accompanying drawings and embodiments. Apparently, these embodiments only constitute some embodiments of the present disclosure. The scope of the present disclosure is by no means limited to embodiments as set forth herein.

The drawings only illustrate constructions and/or parts relevant with the inventive concepts, while constructions and/or parts irrelevant with the inventive concepts are not indicated or partially indicated.

For ease of reading, components are suffixed with corresponding reference numerals: active area: AA; dummy area: DA; liquid crystal cell: 100, 200, 300, 400, 500; color filter substrate: 101, 201, 301, 401, 501; array substrate: 102, 202, 302, 402, 502; frame sealant: 103, 203, 303, 403, 503; liquid crystal: 104, 204, 304, 404, 504; ball spacer: 105; post spacer: 206; main spacer: 307, 407, 507; sub-spacer: 308, 408, 508; filler: 110, 210, 310, 410, 510; and buffer belt: 120, 220, 320, 420.

Figure 1B:
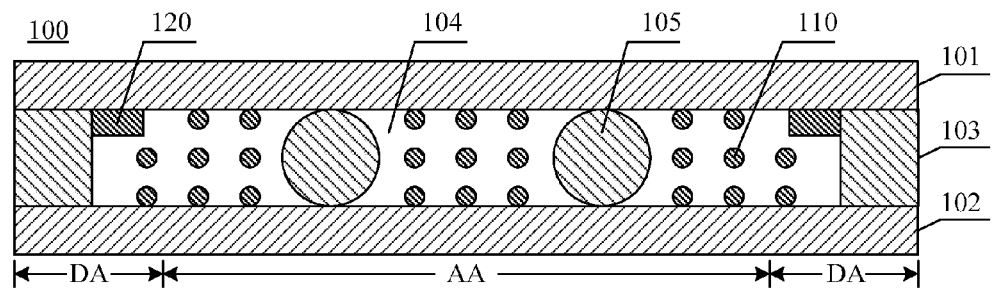

FIGS. 1A-1B are cross-sectional views illustrating a liquid crystal cell 100 of the present disclosure which comprises ball spacers.

As shown in FIG. 1A, the liquid crystal cell 100 is divided into an active area AA and a dummy area DA. In the present embodiment, the liquid crystal cell 100 comprises a color filter substrate 101, an array substrate 102, a frame sealant 103, liquid crystal 104 arranged between the color filter substrate 101 and the array substrate 102, and spacers 105 arranged between the color filter substrate 101 and the array substrate 102 for maintaining a thickness of the liquid crystal cell. As shown, the spacers 105 can be ball spacers. According to the present disclosure, the liquid crystal cell 100 can further comprise a volume variation compensating component in the active area AA. The volume variation compensating component comprises a material with a thermal expansion coefficient opposite to that of the liquid crystal 104, so as to compensate variation in the volume of liquid crystal 104 when temperature varies.

As shown, the volume variation compensating component can be implemented as fillers 110 which are dispersed in the liquid crystal 104. Optionally, the fillers 110 can be nano-spheres, nanowires, nanotubes, or nanoparticles, so that transparency in the active area AA of the liquid crystal cell 100 is not impaired. The fillers 110 can have regular shapes or irregular shapes. Optionally, the fillers 110 can be dispersed uniformly in the liquid crystal 104.

Optionally, the fillers 110 can be mixed with the liquid crystal in advance and then dropped onto the array substrate 102. Alternatively, the fillers 110 can be dispersed onto the array substrate 102 directly prior to, simultaneously with, or directly after dropping liquid crystal, so as to mix with the liquid crystal 104.

The liquid crystal cell 100 of FIG. 1B differs from that of FIG. 1A in that, the the liquid crystal cell 100 can further comprise a buffer belt 120 arranged in the dummy area DA. The buffer belt 120 can comprise a material with a thermal expansion coefficient opposite to that of the liquid crystal 104, so as to compensate variation in the volume of liquid crystal 104 when temperature varies. As shown, the buffer belt 120 can be arranged on the color filter substrate 101. Alternatively, the buffer belt 120 can be arranged on the array substrate 102, or can be arranged on both the color filter substrate 101 and the array substrate 102. Optionally, the buffer belt 120 can be disposed on the color filter substrate 101 and/or the array substrate 102 by means of adhesive. Alternatively, the buffer belt 120 can be disposed on the color filter substrate 101 and/or the array substrate 102 by coating, depositing, or printing. It is noted that the buffer belt 120 can be either continuous or discontinuous, and the buffer belt 120 can have a cross-section of any shape.

Figure 2A:
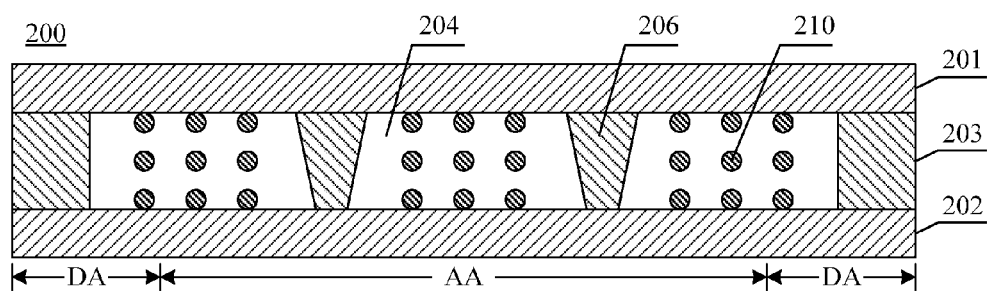
FIGS. 2A-2B are cross-sectional views illustrating a liquid crystal cell of the present disclosure in a second scenario, respectively.
Figure 2B:
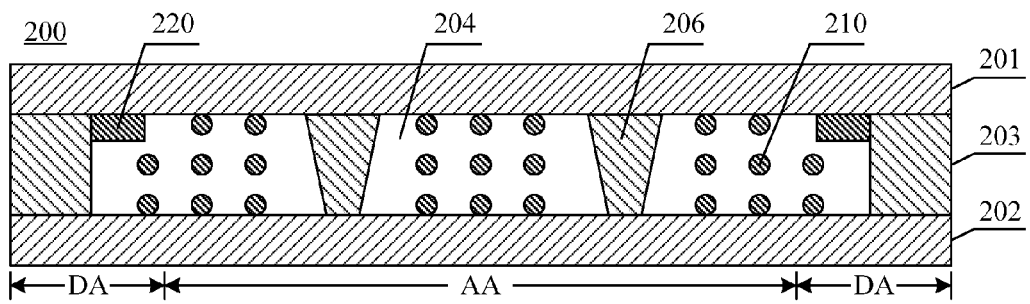

FIGS. 2A-2B are cross-sectional views illustrating a liquid crystal cell 200 of the present disclosure which comprises post spacers.

As shown in FIG. 2A, the liquid crystal cell 200 can comprise a color filter substrate 201, an array substrate 202, a frame sealant 203, liquid crystal 204 arranged between the color filter substrate 201 and the array substrate 202, and spacers 206 arranged between the color filter substrate 201 and the array substrate 202 for maintaining a thickness of the liquid crystal cell. As shown, the spacers 205 can be post spacers. The spacers 205 are shown as being arranged on the color filter substrate 201. However, the spacers 205 can optionally be arranged on the array substrate 202. There is no intention to limit the shape of cross-section of the post spacers 205. Similar with the embodiment of FIG. 1A, the volume variation compensating component can be implemented as fillers 210 which are dispersed in the liquid crystal 204. The details for the fillers 210 are similar with the fillers 110 shown in FIG. 1A, which are not repeated for simplicity.

The liquid crystal cell 200 of FIG. 2B differs from that of FIG. 2A in that, the liquid crystal cell 200 can further comprise a buffer belt 220 arranged in the dummy area DA. The buffer belt 220 can comprise a material with a thermal expansion coefficient opposite to that of the liquid crystal 204, so as to compensate variation in the volume of liquid crystal 204 when temperature varies. The details for the buffer belt 220 are similar with the buffer belt 120 shown in FIG. 1B, which are not repeated for simplicity.

Figure 3A:
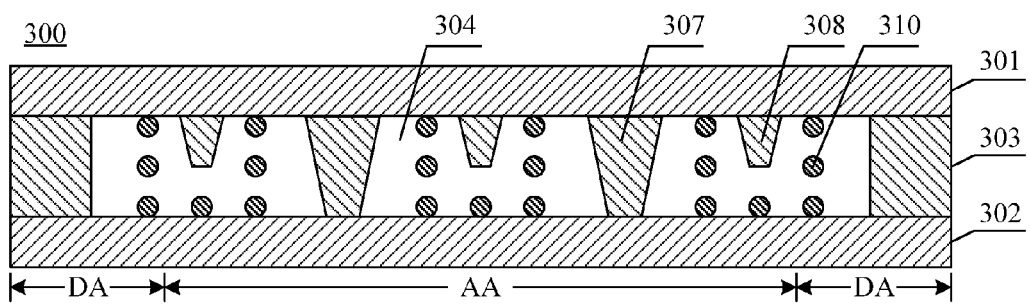
FIGS. 3A-3B are cross-sectional views illustrating a liquid crystal cell of the present disclosure in a third scenario, respectively.
Figure 3B:
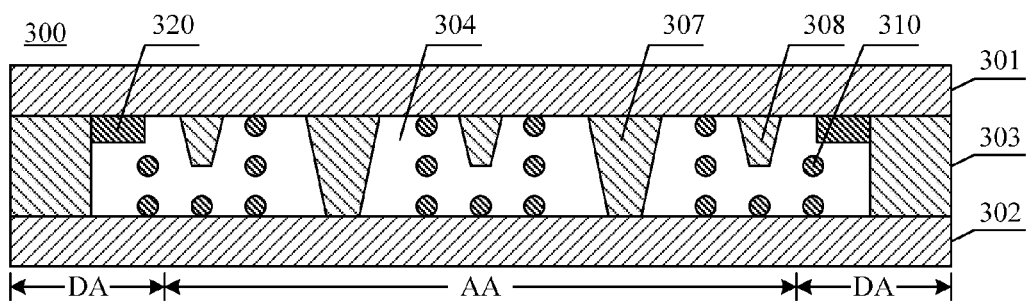

FIGS. 3A-3B are cross-sectional views illustrating a liquid crystal cell 300 of the present disclosure which comprise post-shaped main spacers 307 and sub-spacers 308.

As shown in FIG. 3A, the liquid crystal cell 300 can comprise a color filter substrate 301, an array substrate 302, a frame sealant 303, liquid crystal 304 arranged between the color filter substrate 301 and the array substrate 302, and spacers 307, 308 arranged between the color filter substrate 301 and the array substrate 303 for maintaining a thickness of the liquid crystal cell. As shown, the spacers can be post spacers, and can comprise main spacers 307 and sub-spacers 308 with a height smaller than that of the main spacers 307. It is beneficial to arrange main spacers 307 and sub-spacers 308 in the liquid crystal cell 300. Once the color filter substrate 301 and the array substrate 302 are assembled, main spacers 307 get in contact with the array substrate 302, thus providing a supporting force for maintaining a cell thickness between the color filter substrate 301 and the array substrate 302, i.e., the thickness of the liquid crystal cell 300. In case that the liquid crystal cell 300 is pressed, the sub-spacer 308 will get in contact with the array substrate 302 and improve the pressure-resistant property, so that a depression caused by the pressing is recovered as soon as possible. Herein, the spacers 307, 308 are shown as being arranged on the color filter substrate 301. However, the spacer 307, 308 can optionally be arranged on the array substrate 302. There is no intention to limit the shape of cross-section of the spacers 307, 308. Similar with the embodiment of FIG. 1A, the volume variation compensating component can be implemented as fillers 310 which are dispersed in the liquid crystal 304. The details for the fillers 310 are similar with the fillers 110 shown in FIG. 1A, which are not repeated for simplicity.

The liquid crystal cell 300 of FIG. 3B differs from that of FIG. 3A in that, the liquid crystal cell 300 further comprises a buffer belt 320 arranged in the dummy area DA. The buffer belt 320 can comprise a material with a thermal expansion coefficient opposite to that of the liquid crystal 304, so as to compensate variation in the volume of liquid crystal 304 when temperature varies. The details for the buffer belt 320 are similar with the buffer belt 120 shown in FIG. 1B, which are not repeated for simplicity.

FIGS. 4A, 4B, 4C and 4D are cross-sectional views illustrating a liquid crystal cell 400 of the present disclosure, in which the sub-spacers 408 comprise a material with a negative thermal expansion coefficient.

Figure 4A:
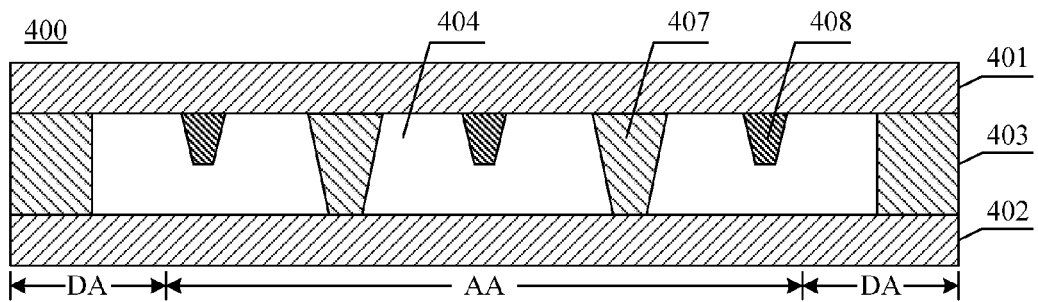
FIGS. 4A, 4B, 4C and 4D are cross-sectional views illustrating a liquid crystal cell of the present disclosure in a fourth scenario, respectively.

As shown in FIG. 4A, the liquid crystal cell 400 can comprise a color filter substrate 401, an array substrate 402, a frame sealant 403, liquid crystal 404 arranged between the color filter substrate 401 and the array substrate 402, and spacers 407, 408 arranged between the color filter substrate 401 and the array substrate 403 for maintaining a thickness of the liquid crystal cell. The embodiment of FIG. 4A differs from that of FIG. 3A in that, the sub-spacers 408 can comprise a material with a negative thermal expansion coefficient. In other words, the volume variation compensating component can be implemented as sub-spacers 408 of a material with a negative thermal expansion coefficient.

Figure 4B:
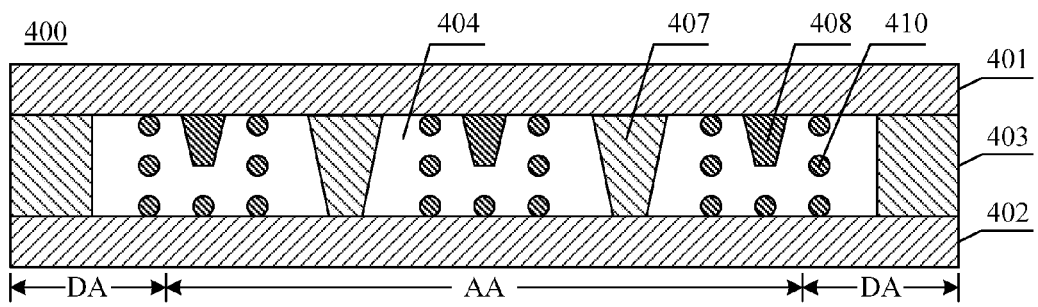

As compared with the embodiment of FIG. 4A, the liquid crystal cell 400 of FIG. 4B can further comprise fillers 410 which are dispersed in the liquid crystal 404. The details for the fillers 410 are similar with the fillers 110 shown in FIG. 1A, which are not repeated for simplicity.

Figure 4C:
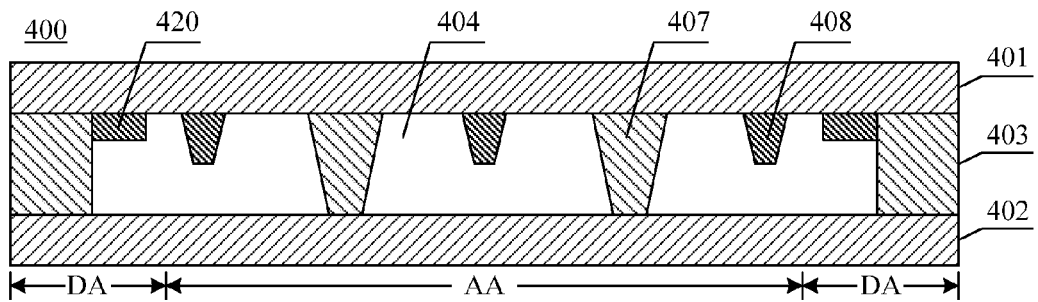

As compared with the embodiment of FIG. 4A, the liquid crystal cell 400 of FIG. 4C can further comprise a buffer belt 420 arranged in the dummy area DA. The buffer belt 420 can comprise a material with a thermal expansion coefficient opposite to that of the liquid crystal 404, so as to compensate variation in the volume of liquid crystal 404 when temperature varies. The details for the buffer belt 420 are similar with the buffer belt 120 shown in FIG. 1B, which are not repeated for simplicity.

Figure 4D:
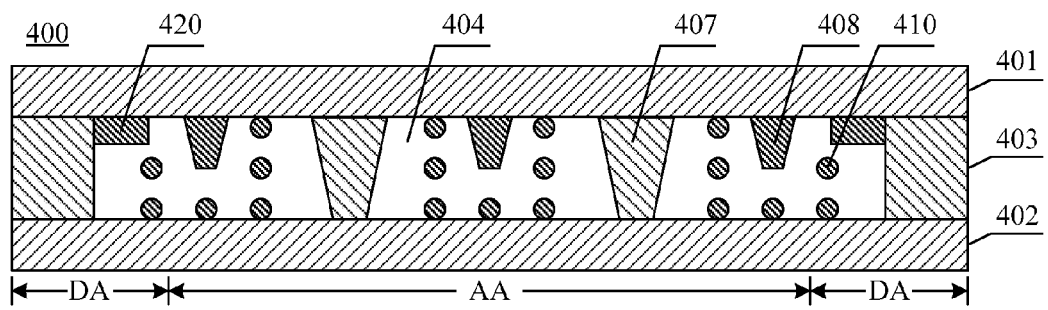

As compared with the embodiment of FIG. 4A, the liquid crystal cell 400 of FIG. 4D can further comprise fillers 410 dispersed in the liquid crystal 404 and a buffer belt 420 arranged in the dummy area DA. The details for the fillers 410 are similar with the fillers 110 shown in FIG. 1A, and the details for the buffer belt 420 are similar with the buffer belt 120 shown in FIG. 1B, which are not repeated for simplicity.

Figure 5A:
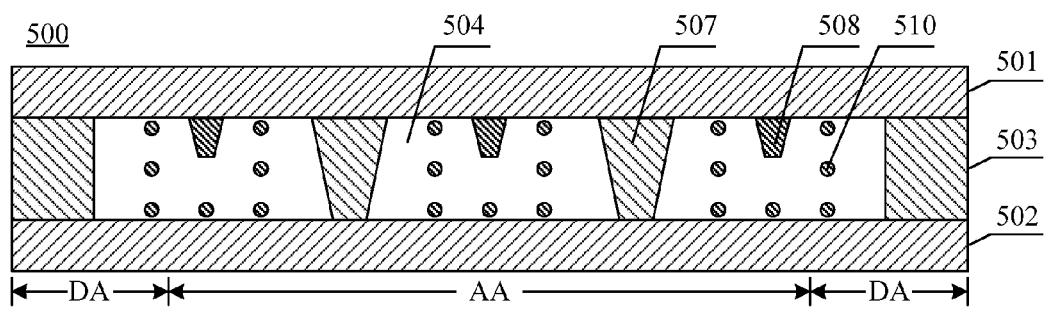
FIGS. 5A-5B are schematic views illustrating the liquid crystal cell of FIG. 4B at high temperature and at low temperature, respectively.
Figure 5B:
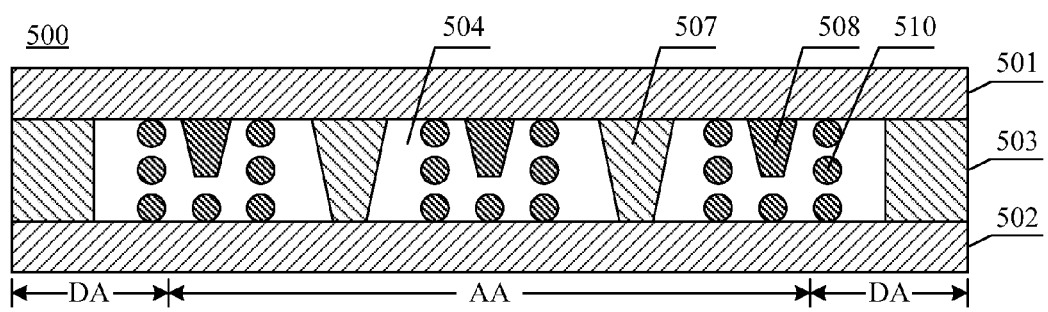

FIGS. 5A-5B respectively illustrate a liquid crystal cell 500 of the present disclosure at high temperature and at low temperature, for purpose of explaining the underlying mechanism of the volume variation compensating component. It is noted that the liquid crystal cell 500 of FIGS. 5A-5B corresponds to the liquid crystal cell 400 of FIG. 4B.

As shown in FIG. 5A, when the liquid crystal cell 500 is at high temperature, the liquid crystal 510 generally has a positive thermal expansion coefficient and thus increases in its volume (not shown), while the sub-spacers 508 and fillers 510 shrink since they comprise a material with a negative thermal expansion coefficient. Therefore, the sub-spacer 508 and fillers 510 release the space inside the liquid crystal cell 500 to the liquid crystal 504, so as to eliminate gravity mura at high temperature.

As shown in FIG. 5B, when the liquid crystal cell 500 is at low temperature, the liquid crystal 510 shrinks (not shown), while the sub-spacer 508 and fillers 510 expand since they comprise a material with a negative thermal expansion coefficient. Therefore, the sub-spacer 508 and fillers 510 make up vacuum bubbles in the liquid crystal cell 500 which would otherwise be formed due to shrinkage of the liquid crystal 504, so as to eliminate bubbles at low temperature.

As shown in FIGS. 5A-5B, by providing a volume variation compensating component in the active area of the liquid crystal cell, which comprises a material with a thermal expansion coefficient opposite to that of the liquid crystal, it is possible to compensate variation in the volume of liquid crystal when temperature varies. Thereby, not only defects of gravity mura at high temperature and bubbles at low temperature are eliminated to spread LC Margin, but also the scope of application environment (e.g. the range of operational temperature) for the liquid crystal display panel is expanded. Besides, according to the present disclosure, the optical properties of the liquid crystal cell, such as the transparency of active area, will not be influenced. By appropriately selecting the material of the volume variation compensating component (i.e., a material with a negative thermal expansion coefficient) and its content, variation in the volume of liquid crystal when temperature varies can be cancel out completely.

The material with a negative thermal expansion coefficient as discussed herein can be any material with a negative thermal expansion coefficient, e.g., anisotropic negative thermal expansion materials listed in Table 1.

TABLE 1

| chemical composition of material | average linear expansion coefficient (*$10^{-6}$/° C.) | temperature range (° C.) |
| --- | --- | --- |
| $Li_2Al_2Si_2O_8$ | −6.2 | 25~1000 |
| $PbTiO_3$ | −5.4 | 100~600 |
| $KAlSi_2O_6$(synthetic) | −20.8 | 800~1200 |
| $KAlSi_2O_6$(natural) | −28.3 | 900~1200 |
| $Sc_2W_3O_{12}$ | −11 | −263~977 |
| $Lu_2W_3O_{12}$ | −6.8 | 127~627 |
| $Sc_2Mo_3O_{12}$ | −1.1 | −153~320 |
| $LiZr_2P_3O_{12}$ | −4.0 | −200~500 |
| $NaZr_2P_3O_{12}$ | −0.4 | 2~1000 |
| $SiO_2$(tridymite) | −4.3 | 900~1500 |
| $SiO_2$(cristobalite) | −1.7 | 1000~1300 |
| $SiO_2$(quartz) | −12 | 1100~1500 |

Optionally, the material with a negative thermal expansion coefficient in the liquid crystal cell 100, 200, 300, 400, 500 can be isotropic negative thermal expansion materials. For example, the material with a negative thermal expansion coefficient as discussed herein can be isotropic negative thermal expansion materials listed in Table 2.

TABLE 2

| material chemical composition | average linear expansion coefficient (*$10^{-6}$/° C.) | temperature range (° C.) |
| --- | --- | --- |
| $ZrW_2O_8$ | −8.8 | −273~777 |
| $HfW_2O_8$ | −8.7 | −273~777 |
| $ZrV_2O_7$ | −10.8 | 100~800 |
| $ThP_2O_7$ | −8.1 | 300~1200 |

A semi-quantitative analysis is conducted hereinafter to illustrate the mechanism of the volume variation compensating component. It is noted that this analysis intends to interpret principles of the present disclosure, not to limit the present disclosure in any manner.

It is assumed that the main post spacers have a height of $H_M$, the sub post spacers have a height of $H_S$, the liquid crystal cell has a thickness of d, the liquid crystal has an average linear thermal expansion coefficient of $\alpha$, the effective area in the liquid crystal cell is S, the liquid crystal has a volume of $V_{LC}$, the volume variation compensating component has a volume of $V_{VC}$, the liquid crystal cell has a volume of $V_C$, the volume variation compensating component has a linear expansion coefficient of $\beta$, a ratio between the volume of the volume variation compensating component and the liquid crystal is $\gamma$, and the temperature variation is $\Delta T$.

Generally, the criterion for determining bubbles at low temperature is that the thickness d of the liquid crystal cell should be larger than the height $H_S$ of the sub post spacer, i.e., variation $\Delta d$ in thickness of the liquid crystal cell should be less than or equal to a height difference $|H_M-H_S|$ between the main post spacers and the sub post spacers. In addition, the criterion for determining gravity mura is that the thickness d of liquid crystal cell should be less than or equal to the height $H_M$ of main post spacers. In this way, calculations follow.

variation in volume of liquid crystal:

$$\Delta V_{LC}=(\alpha \Delta T)^3 V_{LC} \qquad [1];$$

variation in volume of volume variation compensating component:

$$\Delta V_B=(\beta \Delta T)^3 \gamma V_{LC} \qquad [2];$$

variation in volume of liquid crystal cell:

$$\Delta V_C=\Delta V_{LC}+\Delta V_B=(\alpha \Delta T)^3 V_{LC}+(\beta \Delta T)^3 \gamma V_{LC} \qquad [3]; \text{ and}$$

variation in thickness of liquid crystal cell:

$$\Delta d=\Delta V_C/S=(\alpha \Delta T)^3 V_{LC}/S+(\beta \Delta T)^3 \gamma V_{LC}/S=V_{LC}(\Delta T)^3 (\alpha^3+\gamma \beta^3)/S \qquad [4].$$

The liquid crystal cell shrinks with a decrease in temperature, bubbles appear if $|\Delta d|>|H_M-H_S|$ is satisfied. The liquid crystal cell expands with an increase in temperature, gravity mura appears if $d+|\Delta d|>H_M$ is satisfied. In other cases, bubbles and gravity mura will not appear. Since the liquid crystal material generally is a positive thermal expansion material and the proposed volume variation compensating component is a negative thermal expansion material, $\alpha$ and $\beta$ are opposite in sign. It is possible to effectively eliminate bubbles at low temperature, and alleviate gravity mura at high temperature. In addition, it can be seen from equation [4] that, by appropriately selecting the volume percentage $\gamma$ and the linear expansion coefficient $\beta$ of the volume variation compensating component, it is possible to partially, or even completely cancel out the influence of variation in volume of liquid crystal when temperature varies.

Figure 6:
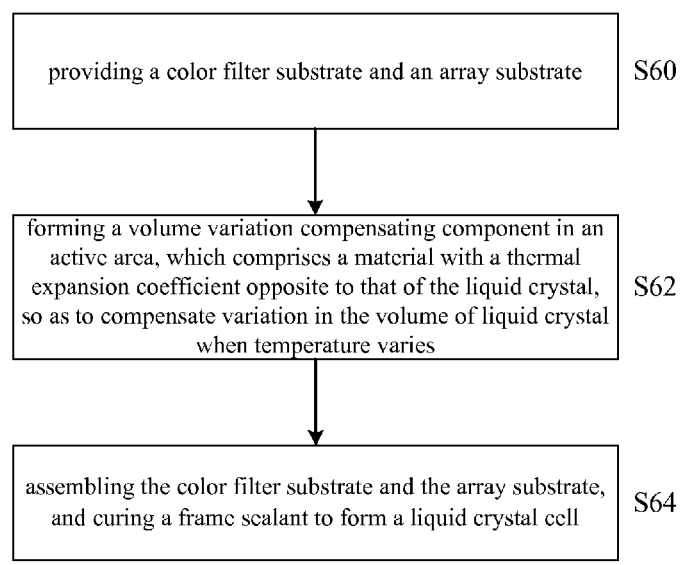
FIG. 6 is a schematic view illustrating a method for fabricating a liquid crystal cell of the present disclosure.

FIG. 6 is a flow chart illustrating a method for fabricating a liquid crystal cell of the present disclosure. As shown in FIG. 6, in an embodiment, a method for fabricating a liquid crystal cell comprises steps of: providing a color filter substrate and an array substrate; forming a volume variation compensating component in an active area, which comprises a material with a thermal expansion coefficient opposite to that of the liquid crystal, so as to compensate variation in the volume of liquid crystal when temperature varies; and assembling the color filter substrate and the array substrate, and curing a frame sealant to form a liquid crystal cell.

Optionally, the method can comprise: prior to dropping liquid crystal onto the array substrate, uniformly dispersing fillers in the liquid crystal. Alternatively, the fillers can be dispersed onto the array substrate directly prior to, simultaneously with, or directly after dropping liquid crystal, so as to mix with the liquid crystal.

Optionally, the method can comprise: forming main spacers and sub-spacers with a height smaller than that of the main spacers on the color filter substrate, wherein the volume variation compensating component forms the sub-spacers.

Optionally, the method can further comprise: in a dummy area, forming the volume variation compensating component as a buffer belt on the color filter substrate and/or the array substrate.

Although the present disclosure has been described above with reference to specific embodiments, it should be understood that the limitations of the described embodiments are merely for illustrative purpose and by no means limiting. Instead, the scope of the disclosure is defined by the appended claims rather than by the description, and all variations that fall within the range of the claims are intended to be embraced therein. Thus, other embodiments than the specific ones described above are equally possible within the scope of these appended claims.

The invention claimed is:

1. A liquid crystal cell, comprising an active area and a dummy area, and comprising a first and second substrate which are arranged oppositely and separated by spacers, and liquid crystal arranged between the first and second substrate,
wherein the liquid crystal cell further comprises a volume variation compensating component which is arranged in the active area, and the volume variation compensating component comprises a material with a thermal expansion coefficient opposite to that of the liquid crystal, wherein when the liquid crystal decreases in volume due to temperature variation, the volume variation compensating component increases in volume, or when the liquid crystal increases in volume due to temperature variation, the volume variation compensating component decreases in volume,
wherein the spacers are post spacers, and
wherein the spacers comprise main spacers and sub-spacers with a height smaller than that of the main spacers, and the volume variation compensating component forms the sub-spacers.

2. The liquid crystal cell of claim 1, wherein the volume variation compensating component further comprises fillers which are uniformly dispersed within the liquid crystal.

3. The liquid crystal cell of claim 2, wherein the fillers are nanospheres, nanowires, or nanotubes.

4. The liquid crystal cell of claim 1, wherein the volume variation compensating component further comprises a buffer belt which is arranged in the dummy area.

5. The liquid crystal cell of claim 4, wherein the buffer belt is arranged on the first substrate and/or the second substrate.

6. The liquid crystal cell of claim 1, wherein the volume variation compensating component comprises a material with a negative thermal expansion coefficient.

7. The liquid crystal cell of claim 6, wherein the negative thermal expansion coefficient material has an isotropic thermal expansion coefficient.

8. The liquid crystal cell of claim 7, wherein the negative thermal expansion coefficient material is selected from the group consisting of $ZrW_2O_8$, $HfW_2O_8$, $ZrV_2O_7$, and $ThP_2O_7$.

9. The liquid crystal cell of claim 1, wherein the first substrate is a color filter substrate, and the second substrate is an array substrate.

10. A display device, comprising the liquid crystal cell of claim 1.

11. The display device of claim 10, wherein the volume variation compensating component is fillers which are uniformly dispersed within the liquid crystal.

12. A method for fabricating a liquid crystal cell, comprising steps of:
providing a color filter substrate and an array substrate;
forming a volume variation compensating component in an active area, which comprises a material with a thermal expansion coefficient opposite to that of the liquid crystal, wherein when the liquid crystal decreases in volume due to temperature variation, the volume variation compensating component increases in volume, or when the liquid crystal increases in volume due to temperature variation, the volume variation compensating component decreases in volume; and
assembling the color filter substrate and the array substrate, and curing a frame sealant to form a liquid crystal cell,
wherein the step of forming the volume variation compensating component comprises:
forming main spacers and sub-spacers with a height smaller than that of the main spacers on the color filter substrate, wherein the volume variation compensating component forms the sub-spacers.

13. The method of claim 12, wherein the step of forming the volume variation compensating component further comprises: uniformly dispersing fillers in the liquid crystal, and dropping the liquid crystal onto the array substrate.

14. The method of claim 12, further comprise: in a dummy area, forming the volume variation compensating component as a buffer belt on the color filter substrate and/or the array substrate.

* * * * *